D. MATTHEW.
Car-Axle Box.

No. 22,439.  Patented Dec. 28, 1858.

Witnesses:
Charles D. Freeman
Wm. W. Hubbell

Inventor:
David Matthew

UNITED STATES PATENT OFFICE.

DAVID MATTHEW, OF PHILADELPHIA, PENNSYLVANIA.

LOCOMOTIVE AXLE-BEARING.

Specification of Letters Patent No. 22,439, dated December 28, 1858.

*To all whom it may concern:*

Be it known that I, DAVID MATTHEW, of the city of Philadelphia and State of Pennsylvania, have invented a new and useful Impovement in Locomotive Axle-Bearings; and I do hereby declare the following to be a full, clear, and exact description thereof, reference being had to the annexed drawings, forming part hereof.

The nature of my invention consists in a certain improvement in the journal bearings for the purpose of preventing the horizontal wear to be hereinafter more fully described.

To enable others skilled in the art to make and use my invention, I shall proceed to describe its construction and operation, reference being had to the accompanying drawings in which similar letters in the different figures indicate like parts and in which—

Figure 1:
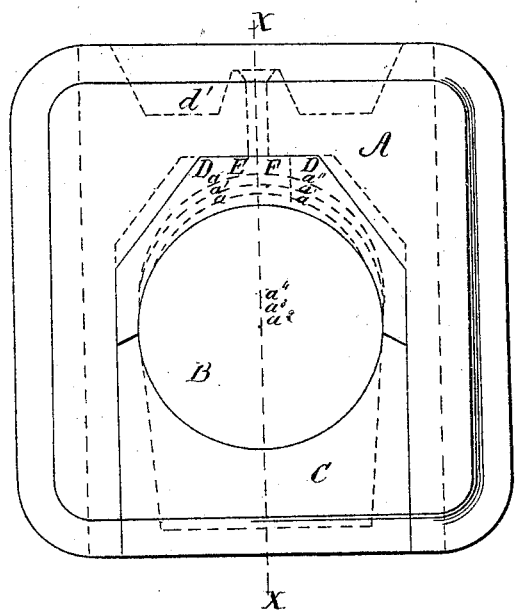
Figure 2:
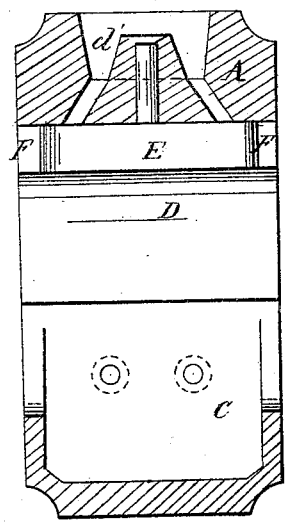
Figure 3:
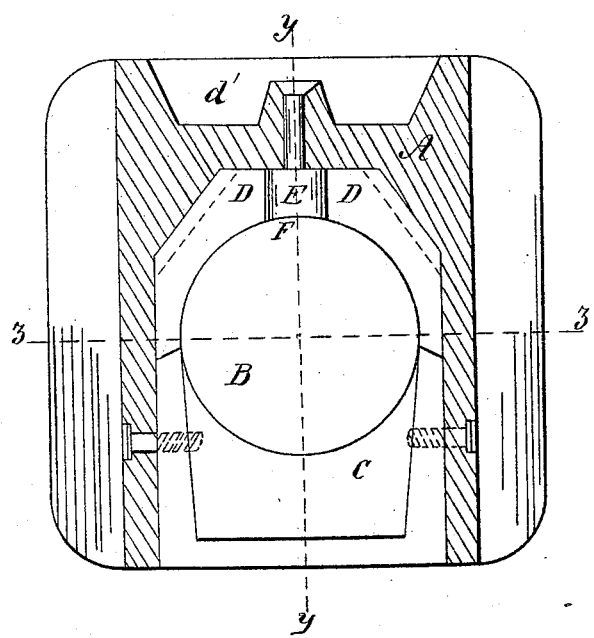
Figure 4:
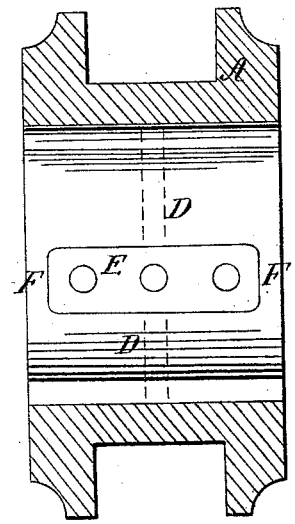

Figure 1 is a side elevation. Fig. 2, is a vertical section at $x$ $x$, Fig. 1. Fig. 3, is a transverse section of Fig. 1, at right angles to Fig. 2. Fig. 4, is a section horizontally at $z$ $z$ Fig. 2, showing the upper part.

"A" is the box.

"B" is the hole through which the journal passes.

"C" is the oil cellar.

"DD" are the bearings of brass; $d'$ the oil cup.

"E" is a slot cut through the thickness of the brass, and extending the whole length of the bearing with the exception of connecting pieces "F" at each end.

It is a well known fact that in locomotive engines, where the horizontal strain greatly exceeds the vertical pressure, the bearing will wear more horizontally than in any other direction, or in other words it wears more in the direction of the greater pressure. To obviate the injurious effects resulting from the wearing of an oblong hole whose greatest diameter is the horizontal one, and also obviate the inconvenience of having the bearing in two separate parts, as described in my patent of January 12, 1858, I so graduate the bearing surface to the pressure that it shall increase or diminish with corresponding increase or diminution of pressure, or if there is any disproportion let the irregularity be in favor of pressure, without changing the form of the inside of the box now used, without admitting the passage of dust or oil at the sides of the bearing, and keep the bearing in one piece. To do this I cut away the upper portion of the bearing surface, cutting the metal nearly through in both directions; and sometimes completely through in a vertical direction, leaving connecting pieces between the sides of the bearing, and widening the space cut to compensate for the direct resistance of the connecting pieces. The direct effect of this, it will be readily seen is, that the bearing, instead of wearing in the direction of the greater pressure, or horizontally, will wear away the connecting pieces and upward vertically with the less pressure, to the exclusion of the dust with a proper fit to each end of the bearing, and without changing the form of the inside of the box in use, as is required in my patent of January 12, 1858.

By proportioning the width of the slot E to the degree of downward pressure and resistance of the connecting pieces relative to the lateral or horizontal strains the wear may be made to assume any direction between the vertical pressure and the horizontal strains. The direction of the wear is shown in Fig. 1, by the eccentric circles $a$ $a'$ $a''$ drawn with the centers $a^2$ $a^3$ $a^4$ respectively.

It will be observed that the brasses or bearing DD reach below the center or line of center of the shaft.

The directions of strain are shown by the red lines at right angles "$y, y$" and "$z, z$" in Fig. 3.

The number of connecting pieces may be varied from one or more by increasing the width of the slot to compensate for their resistance to the vertical wear; and a thin sheet or body of metal may be left across the top of the slot, without changing its principle; or the whole bearing, or box and bearing surface, in proper form and proportion may be cast of one kind of metal and in one piece.

I am well aware that it it common to use a crease in journal bearings for purposes in connection with lubrication, but they have no such effect nor construction as mine, and I do not wish to be mistaken as using a mere modification of such crease, or as claiming any such arrangement or device. But What I do claim as my invention and desire to secure by Letters Patent is—

The peculiar construction of journal box or bearing in one piece having a longitudinal slot or opening operating as and for the purpose substantially as herein set forth.

DAVID MATTHEW.

Witnesses:
CHARLES D. FREEMAN,
WM. W. HUBBELL.